(12) United States Patent
Yokoue (10) Patent No.: US 7,050,141 B2
(45) Date of Patent: May 23, 2006

(54) MANUFACTURING METHOD AND BONDING APPARATUS WITH VACUUM CHUCK WITH INDEPENDENT RETAINING PORTIONS FOR LIQUID CRYSTAL (LCD) DEVICE

(75) Inventor: Toshiyuki Yokoue, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 10/726,957

(22) Filed: Dec. 3, 2003

(65) Prior Publication Data

US 2004/0145698 A1    Jul. 29, 2004

(30) Foreign Application Priority Data

Dec. 27, 2002    (JP) .............................. 2002-379007

(51) Int. Cl.
*G02F 1/13*    (2006.01)
(52) U.S. Cl. ...................... 349/187; 349/190
(58) Field of Classification Search ................ 349/190, 349/153, 187
See application file for complete search history.

(56) References Cited

U.S. PATENT DOCUMENTS 5,455,696 A * 10/1995 Saito et al. ................. 349/153
6,636,290 B1 * 10/2003 Glownia et al. ............ 349/187
6,798,488 B1 * 9/2004 Murata et al. .............. 349/187
2003/0179336 A1 * 9/2003 Ryu et al. ................... 349/153

FOREIGN PATENT DOCUMENTS

| | | |
|---|---|---|
| JP | 05-181443 | 7/1993 |
| JP | 07-199855 | 8/1995 |
| JP | 11-007273 | 1/1999 |
| JP | 11-102278 | 4/1999 |
| JP | 2000-112447 | 4/2000 |

* cited by examiner

*Primary Examiner*—Andrew Schechter
*Assistant Examiner*—Richard H Kim
(74) *Attorney, Agent, or Firm*—Jeanine S. Ray-Yarletts; Daniel E. McConnell (57) ABSTRACT

A manufacturing method and a bonding apparatus for a liquid crystal display device is provided for that makes it possible to expel remaining bubbles from a liquid crystal and to bond an array substrate and a color filter substrate while maintaining their positional relationship. In a step for bonding an array substrate with a liquid crystal applied thereto and a color filter substrate, vacuum holding of only a central retaining region of an upper vacuum chuck of the bonding apparatus is stopped. This causes the central portion of the color filter substrate to come in contact with the array substrate due to its own weight. The contact region is pressed by a holder to secure the positional relationship between the array substrate and the color filter substrate. Thereafter, with the elapse of time, the upper vacuum chuck increases the retaining region for which a vacuum retaining operation is stopped so as to expand the area of contact between the array substrate and the color filter substrate. As a result, bubbles in the liquid crystal are expelled externally.

4 Claims, 8 Drawing Sheets

MANUFACTURING METHOD AND BONDING APPARATUS WITH VACUUM CHUCK WITH INDEPENDENT RETAINING PORTIONS FOR LIQUID CRYSTAL (LCD) DEVICE

BACKGROUND OF THE INVENTION

1. Field of the Invention

The present invention relates to a manufacturing method and a bonding apparatus for a liquid crystal display (LCD) device and, more particularly, to a manufacturing method and a bonding apparatus for a liquid crystal display device in a cell assembly step and a liquid crystal injection step.

2. Description of Related Art

In a cell assembly step, in a manufacturing process of a liquid crystal display device (hereinafter referred to also as "LCD"), a manufacturing method known as one drop fill (hereinafter referred to as "ODF") has recently been receiving attention. According to the ODF method, a sealant and a liquid crystal are applied to an array substrate before bonding the array substrate with a color filter substrate. This allows the ODF method to reduce the time required for injecting a liquid crystal in a conventional cell assembly process. In other words, the ODF method leads to a significantly reduced time for the liquid crystal injection step, which results in a considerably shorter cell assembly timeline, whereas the conventional cell assembly process requires a lengthier period for injecting a liquid crystal.

Figure 8:
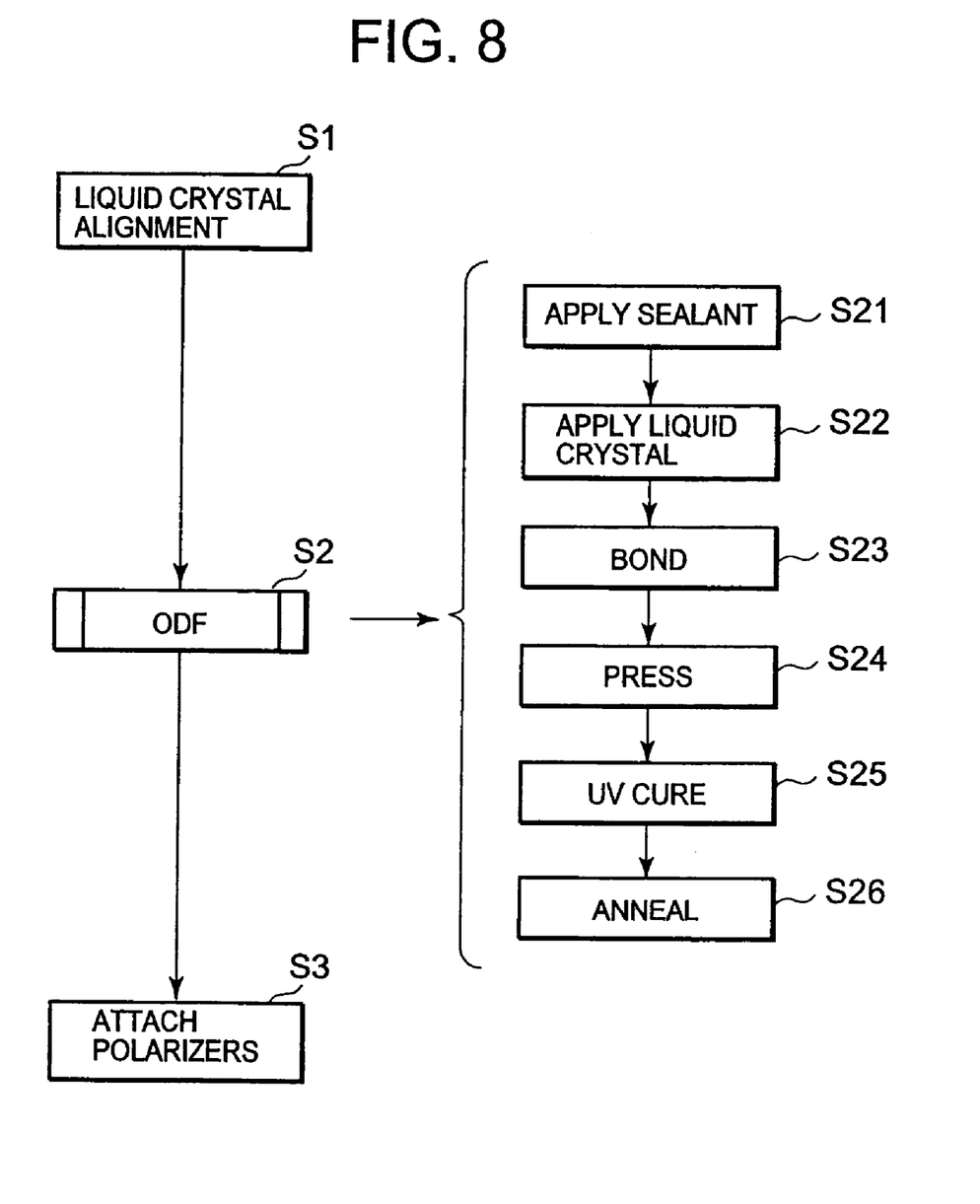
FIG. 8 is a flowchart illustrating a conventional cell assembly process including one drop fill (ODF)

FIG. 8 is a flowchart illustrating a cell assembly process including the ODF. Referring to FIG. 8, the cell assembly process includes a liquid crystal (LC) alignment step (S1), an ODF step (S2) and a polarizer bonding step (S3). In the LC alignment step S1, the array substrate (having an LC alignment layer applied thereto) and a polyimide (PI) film on the surface of the color filter substrate are rubbed in a predetermined direction by a rubbing roll so as to create micro grooves. Liquid crystal molecules are arranged in the predetermined direction along the micro grooves.

The ODF step S2 includes a sealant applying step S21, a liquid crystal applying step S22, a bonding step S23, a pressing step S24, a ultraviolet curing step S25 and an annealing step S26.

Figure 9:
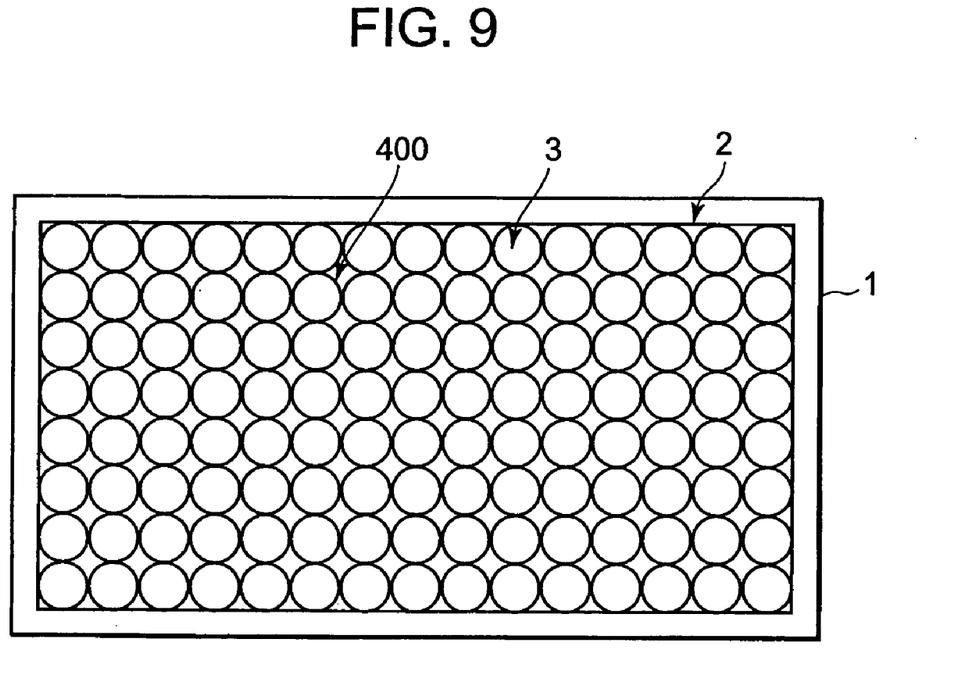
FIG. 9 is a configuration diagram of an array substrate with a liquid crystal applied thereto by a dispenser in a liquid crystal applying step illustrated in FIG. 8.

In the sealant applying step S21, a sealant 2 is applied in a rectangular frame on an array substrate 1 to match the shape of a cell, as shown in FIG. 9. In the liquid crystal applying step S22, a specified amount of a liquid crystal 3 is applied within the sealant 2 on the array substrate 1 by a dispenser. In the bonding step S23, the array substrate 1 and a color filter substrate disposed to oppose the array substrate 1, are bonded to each other in a vacuum.

At the time of bonding the two substrates together, the substrates are positioned such that the individual pixels of the array substrate 1 overlap the three primary colors of the color filter substrate. In the pressing step S24, the array substrate 1 and the color filter substrate bonded to each other in step S23 are contact-bonded by pressing them together. In the ultraviolet curing step S25, ultraviolet rays are applied to the bonded substrate assembly to cure the sealant. In the annealing step S26, isotropic processing for realigning the liquid crystal is carried out. The annealing heat fully cures the sealant 2. In the polarizer bonding step S3, a polarizer is attached to each of the two bonded substrates.

The LCD is fabricated by carrying out the steps of the cell assembly process described above, among which the bonding step is important. In the bonding step, in particular, the two substrates must be accurately positioned and the liquid crystal (after bonding the substrates together) must be free of bubbles. To prevent bubbles from remaining in the liquid crystal, the substrates are conventionally bonded in an intermediate vacuum atmosphere of about 10 Pa. Meanwhile, accurate positioning requires proper selection of a mechanism for holding the substrates. Currently, there are three available methods for holding an array substrate or a color filter substrate, a mechanical method, a vacuum holding method and an electrostatic holding method.

In the mechanical method, a physical means, such as a hook, is used to hold a substrate by securing its outer periphery. As the size of a substrate increases in recent years, the substrate tends to bend more from its own weight when it is retained by the mechanical method. This makes it difficult to achieve higher accuracy of positioning.

In the vacuum holding method, a substrate is attracted by creating a vacuum-like gap between a chuck and a substrate. The chuck used in the vacuum holding method features higher positioning accuracy and less expensive, compared with other methods. The vacuum holding method, however, is disadvantageous in that a substrate cannot be securely held because a pressure difference cannot be obtained between the pressure of the atmosphere and the pressure at which the chuck attracts the substrate when the bonding step is carried out in an intermediate vacuum atmosphere in order to prevent bubbles from remaining in a liquid crystal.

In the electrostatic holding method, a chuck for holding a substrate is electrostatically charged to hold the substrate by Coulomb force. Hence, a substrate can be retained even in a vacuum.

The positioning accuracy of the electrostatic holding method and the vacuum holding method are approximately the same; however, the electrostatic holding method is more extensively used often as substrates are bonded in a vacuum to prevent bubbles from remaining in a liquid crystal. The electrostatic holding method, however, may cause electrostatic damage to a substrate because a voltage of a few thousand volts is applied to retain a substrate. Furthermore, loading and unloading a chuck takes time, so that the bonding step takes time. There is another disadvantage in that the chuck used in the electrostatic holding method is extremely expensive.

Japanese Patent documents 1 through 3 (presented below) disclose a method in which a chucking apparatus uses the vacuum holding method in place of the electrostatic holding method. Patent document 1 discloses the use of a vacuum holding type chuck for improved positioning accuracy, but does not refer to any measures against remaining bubbles. Japanese Patent documents 2 and 3 disclose methods wherein remaining bubbles are prevented by changing the air pressure of the atmosphere in which the bonding step is carried out; this, however, requires a time to change the air pressure, undesirably leading to a longer bonding time.

Patent document 1: Japanese Unexamined Patent Application Publication No. 11-231328

Patent document 2: Japanese Unexamined Patent Application Publication No. 2000-258777

Patent document 3: Japanese Unexamined Patent Application Publication No. 2001-330840

Patent document 4: Japanese Unexamined Patent Application Publication No. 2002-284295

Patent document 5: Japanese Unexamined Patent Application Publication No. 2002-137352

Unfortunately, despite these efforts, a suitable manufacturing method and a bonding apparatus for a liquid crystal display device that allow two substrates to be bonded to each other while expelling bubbles out from a liquid crystal remains desired.

SUMMARY OF THE INVENTION

An object of the present invention is to provide a manufacturing method and a bonding apparatus for a liquid crystal display device that allow two substrates to be bonded to each other while expelling bubbles out from a liquid crystal.

Another object of the present invention is to provide a manufacturing method and a bonding apparatus for a liquid crystal display device that allow two substrates to be accurately bonded to each other without dislocation.

A manufacturing method for a liquid crystal display device according to the present invention includes a step for applying a liquid crystal on a first substrate and a step for bonding a second substrate to the surface of the first substrate to which the liquid crystal has been applied. In the bonding step, a predetermined region of the second substrate is bonded to the first substrate, and the bonded region is expanded with the elapse of time.

According to the manufacturing method, only a part of each of the substrates is first bonded, then the bonded region is gradually expanded. This allows the two substrates to be bonded to each other while expelling bubbles out from the liquid crystal. Preferably, a predetermined region is pressed in the bonding step.

In this case, the two substrates are further firmly positioned, making it possible to accurately bond the two substrates without dislocation. Preferably, the bonding step is carried out in an atmosphere of 100 to 100 kPa, or more preferably 2.7 k to 50 kPa. In this case, the bonding is performed in an area of low vacuum closer to atmospheric pressure, as compared with the degree of vacuum (1 to 10 Pa) in a conventional bonding step, so that the time required for evacuating is reduced, resulting in a higher throughput. Moreover, a vacuum system of the apparatus can be simplified, permitting reduced cost of the apparatus. In addition, as described above, only a part of each of the substrates is brought into contact first, and then the contact region is gradually expanded. This arrangement makes it possible to adequately eliminate remaining bubbles even at low vacuum.

Preferably, the manufacturing method includes a step for fixing the first substrate by a first vacuum chuck and a step for fixing the second substrate by a second vacuum chuck.

In this case, a vacuum chuck is used under low vacuum, so that a sufficient pressure difference, i.e., a retaining force, for attracting a substrate is produced, thus allowing the substrate to be positioned with high accuracy. Preferably the second vacuum chuck has a plurality of retaining regions on a chuck surface thereof, the plurality of retaining regions being capable of performing mutually independent retaining operations and being disposed outwards from the center of the chuck surface. In the bonding step, the retaining operations of the plurality of retaining regions are stopped in order outwards from the center.

In this case, the retaining region at the center stops its retaining operation first, causing the region attracted to that particular retaining region of the second substrate to come off the second vacuum chuck and to be bonded to the first substrate. Subsequently, an outer retaining region adjacent to that particular retaining region also stops its retaining operation, causing the region that has been attracted to the retaining region to be also bonded to the first substrate. Repeating this operation gradually increase the bonded area.

Additionally, in a preferred embodiment, the second vacuum chuck further includes a holder for pressing the second substrate. The predetermined region is pressed by the holder in the bonding step. In this case, the holder retains the two substrates further firmly, making it possible to accurately bond the two substrates without dislocation.

A bonding apparatus in accordance with the present invention includes a first vacuum chuck for fixing a first substrate and a second vacuum chuck that is positioned to oppose the first vacuum chuck and fixes a second substrate. The second vacuum chuck has a plurality of retaining regions on a chuck surface thereof. The plurality of retaining regions is capable of performing mutually independent retaining operations and disposed outwards from the center of the chuck surface. The second vacuum chuck stops the retaining operations of the plurality of retaining regions in order outwards from the center.

In this bonding apparatus, the retaining region at the center stops its retaining operation first, causing the region attracted to that particular retaining region of the second substrate to come off the second vacuum chuck and to be bonded to the first substrate. Subsequently, an outer retaining region adjacent to that particular retaining region also stops its retaining operation, causing the region that has been attracted to the retaining region to be also bonded to the first substrate. Repeating this operation gradually increase the bonded area. As a result, the two substrates can be bonded to each other while expelling bubbles out from the liquid crystal. Preferably, the second vacuum chuck further includes a holder for pressing the second substrate. In this case, the holder retains the two substrates further firmly, making it possible to accurately bond the two substrates without dislocation.

Additionally, in a preferred embodiment, the holder has a curved contact surface. In this case, even if the holder comes in contact with the second substrate, scratches hardly occur.

Additionally, in a preferred embodiment, the holder has a plurality of contact surfaces. In this case, the holder presses the second substrate at a plurality of locations, making it even more difficult for the second substrate to rotate.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Reference herein to "one embodiment" or "an embodiment" means that a particular feature, structure, or characteristic described in connection with the embodiment can be included in at least one embodiment of the invention, but not necessarily in all. The appearances of the phrase "in one embodiment" in various places in the specification, sequentially or otherwise, does not necessarily indicate that each phrase refers to or is used in reference to the same embodiment, nor are separate or alternative embodiments mutually exclusive of other embodiments. The description herein is largely based on a particular method as developed by the inventors identified above. Those skilled in the art will appreciate that the description can be equally applied to other methods involving security, passwords and the like.

Applying a Liquid Crystal

First, a step for applying a liquid crystal in a manufacturing method for a liquid crystal display device according to the embodiment of the invention is set forth.

Figure 1:
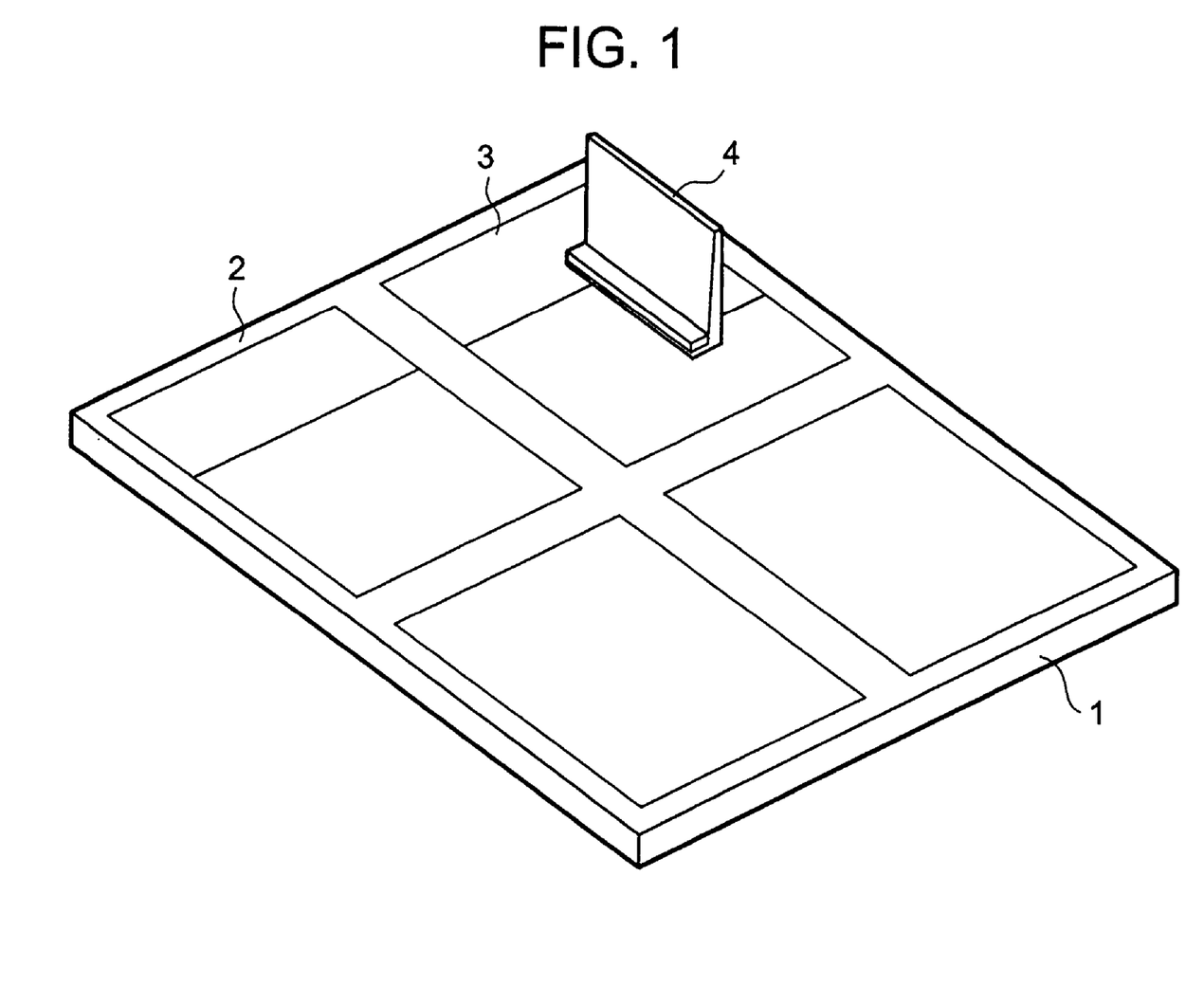
FIG. 1 is a perspective view illustrating a liquid crystal applying process in a manufacturing method for a liquid crystal display device in accordance with an embodiment of the present invention.

FIG. 1 is a perspective view illustrating the step for applying a liquid crystal. Referring to FIG. 1, an array substrate 1 is loaded on an LC alignment stage (not shown). A plurality of sealants 2 is applied in advance onto the array substrate 1. A liquid crystal 3 is applied to a region enclosed by each sealant 2. In this embodiment, a liquid crystal 3 is applied using an inkjet head 4 rather than a dispenser. The ink jet head 4 has a plurality of nozzles, each nozzle being equipped with a piezo-element. The piezo-element expands or contracts in response to a voltage applied thereto. Hence, the inkjet head 4 allows the number of applications per unit time to be dramatically increased, as compared with the dispenser, and also permits the application of an extremely small amount. Thus, the ink jet head 4 makes it possible to apply the liquid crystal more quickly and evenly than the dispenser. The stage horizontally moves during the application of the liquid crystal so as to apply the liquid crystal to a predetermined region.

The portion of the inkjet head 4 that will be in contact with the liquid crystal is preferably made of a material that does not contaminate a liquid crystal and exhibits solvent resistance to survive solvent cleaning. Preferably, the inkjet head 4 permits easy cleaning and survives ultrasonic cleaning. Further preferably, the ink jet head 4 permits application of an extremely small amount, e.g., a few tens of pl, and also permits variable amounts.

Bonding Step

Figure 2:
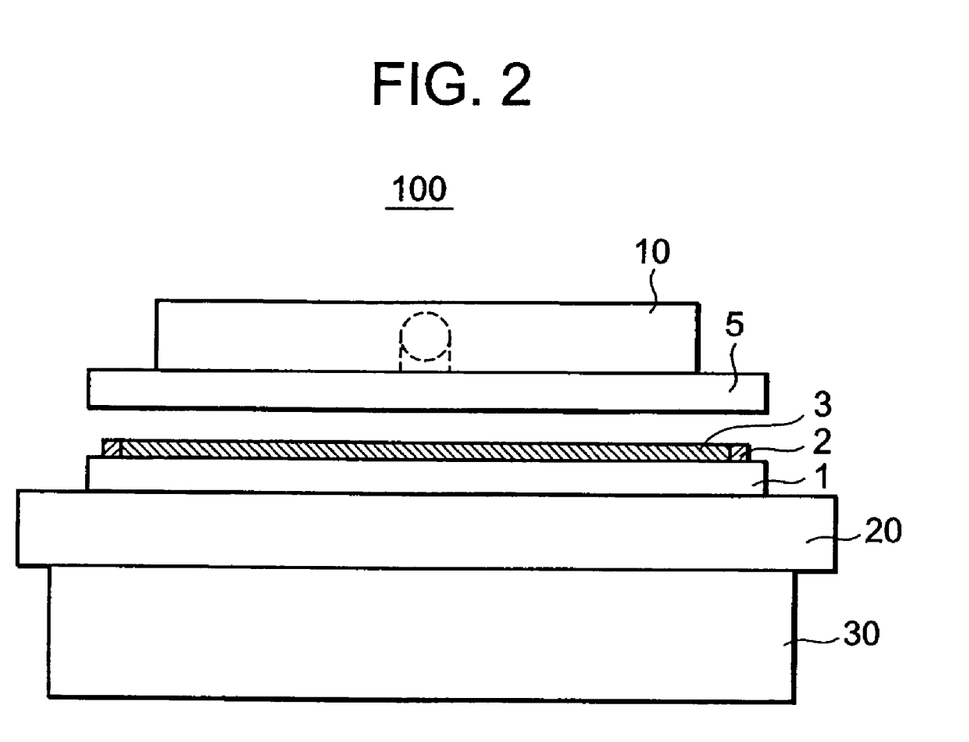
FIG. 2 is a side view showing a construction of a bonding apparatus according to an embodiment of the present invention.

FIG. 2 is a side view of a bonding apparatus according to an embodiment of the invention, sections of the sealant 2 and the liquid crystal 3 being shown. Referring to FIG. 2, a bonding apparatus 100 has an upper vacuum chuck 10, a lower vacuum chuck 20 and an LC alignment stage 30. The upper vacuum chuck 10 is formed of a vacuum holding type retainer adapted to retain a color filter substrate 5 by vacuum holding in the bonding step. The upper vacuum chuck 10 is vertically moved by a servomotor and a ball screw. The lower vacuum chuck 20 is a vacuum holding type retainer adapted to retain the array substrate 1 by vacuum holding in the bonding step. The lower vacuum chuck 20 is fixed on the LC alignment stage 30. The LC alignment stage 30 can be moved horizontally and vertically and also rotated about a vertical axis. This arrangement allows the color filter substrate 5 and the array substrate 1 to be positioned.

Figure 3:
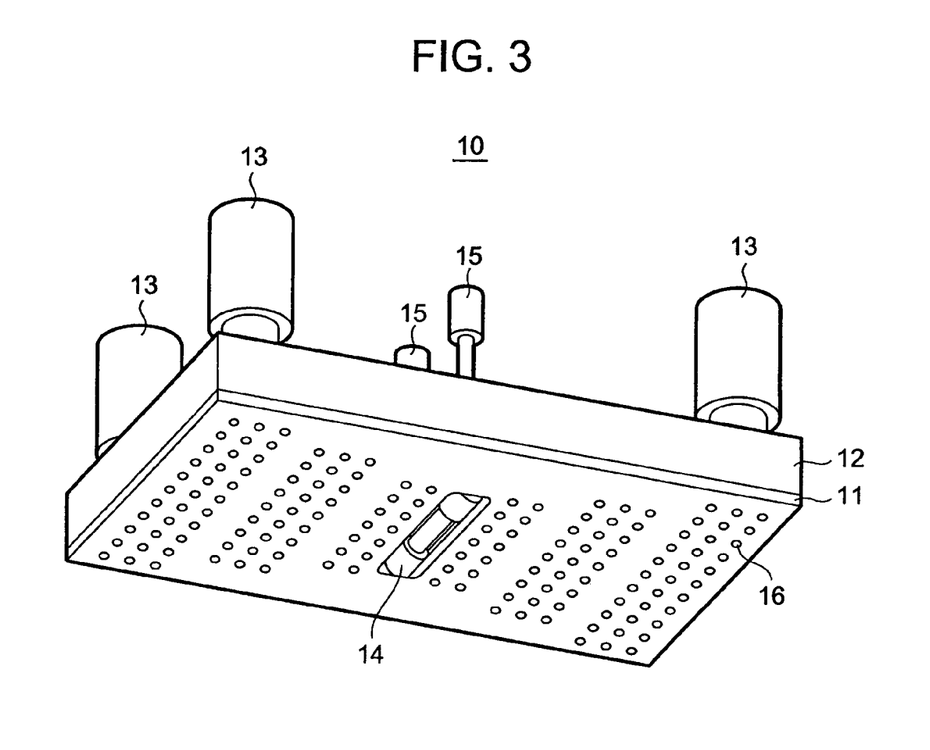
FIG. 3 is a perspective view of an upper vacuum chuck shown in FIG. 2 observed from the bottom surface side thereof.
Figure 4:
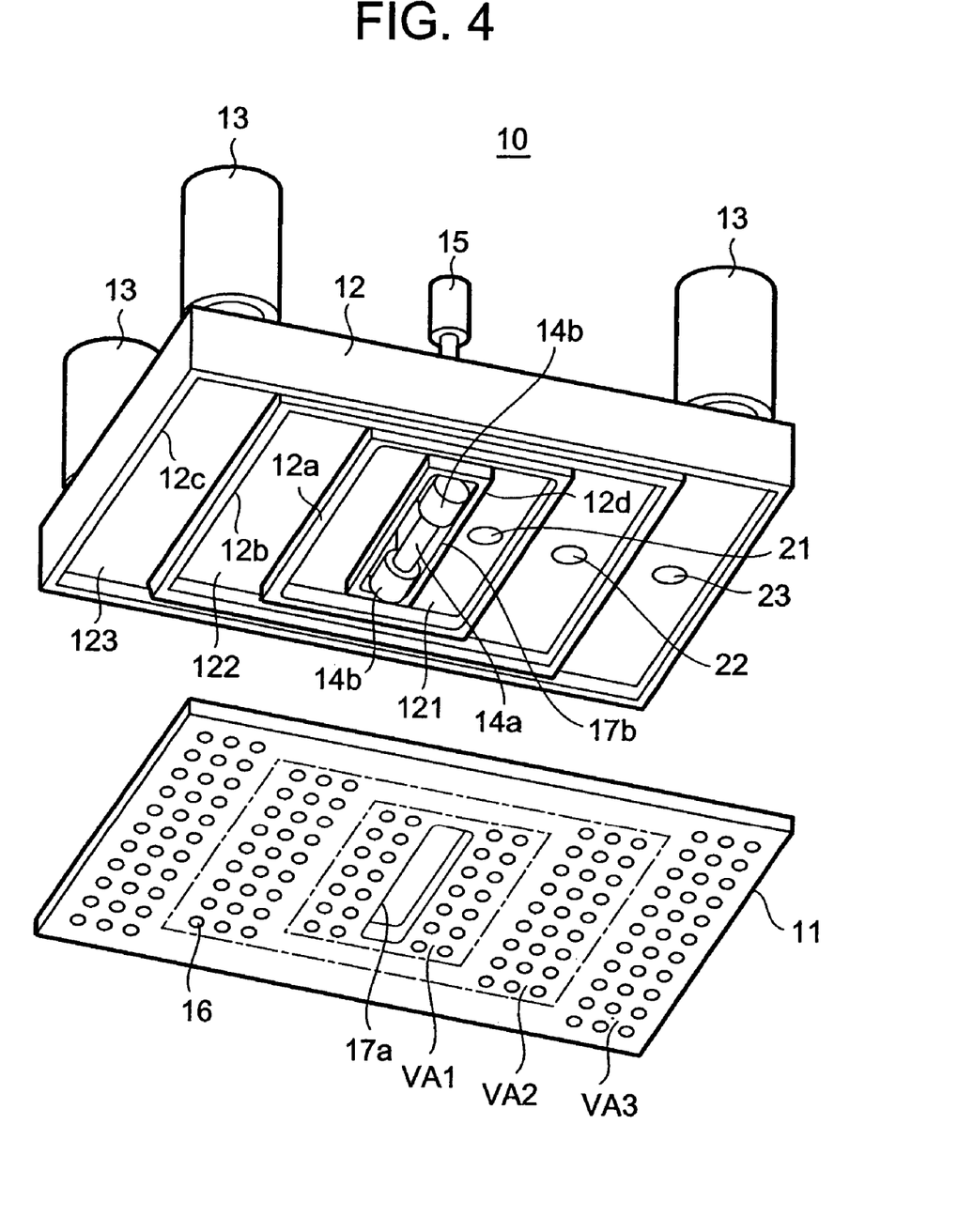
FIG. 4 is an assembly view of the upper vacuum chuck shown in FIG. 3.
Figure 5:
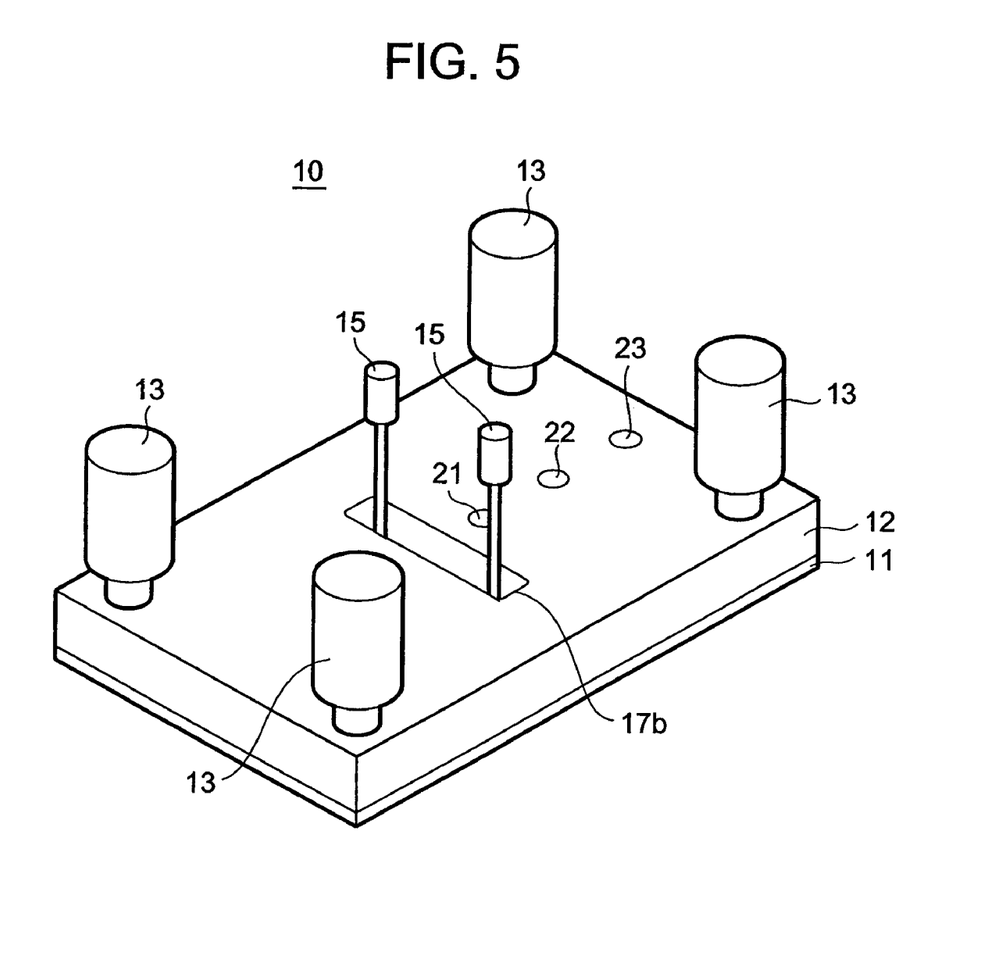
FIG. 5 is a perspective view of the upper vacuum chuck shown in FIG. 2 observed from the top surface side thereof.

FIG. 3 is a perspective view of the upper vacuum chuck 10 observed from its bottom surface, FIG. 4 is an assembly view of the upper vacuum chuck 10 and FIG. 5 is a perspective view of the upper vacuum chuck 10 observed from its top surface. Referring to FIGS. 3 through 5, the upper vacuum chuck 10 has a box 12, a retaining plate 11 covering the box 12 and a holder 14 for pressing the center of the color filter substrate 5.

The box 12 is suspended and supported by four supporting shafts 13 at its four corners. The box supporting shafts 13 are connected by ball screws (not shown), the ball screws being rotated by a servomotor (not shown). Hence, the upper vacuum chuck 10 is vertically moved by driving the servomotor.

The retaining plate 11 has a plurality of vacuum holes 16 for vacuum holding and a through hole 17a for vertically moving the holder 14. The box 12 includes an inner chamber 121 surrounded by a partition 12a, a middle chamber 122 surrounded by a partition 12b and an outer chamber 123 surrounded by a partition 12c. The partition 12a is surrounded by the partition 12b, and the partition 12b is likewise surrounded by the partition 12c. A through hole 17b for enabling the holder 14 to vertically move is formed in a central portion of the box 12. A partition 12d is formed around the through hole 17b. A vacuum hole 21 is formed in the inner chamber 121, a vacuum hole 22 is formed in the middle chamber 122 and a vacuum hole 23 is formed in the outer chamber 123. The chambers 121 through 123 are connected to a vacuum pump (not shown) through the vacuum holes 21 through 23 so as to be independently accommodated. Thus, the chuck surface of the retaining plate 11 has three retaining regions VA1 through VA3 capable of independently performing vacuum holding. The retaining regions VA1 through VA3 are disposed outwards from the center of the chuck surface. More specifically, the retaining region VA1 corresponding to the inner chamber 121 is disposed to surround the through hole 17a at the center, the retaining region VA2 corresponding to the middle chamber 122 is disposed to surround the retaining region VA1, and the retaining region VA3 corresponding to the outer chamber 123 is disposed to surround the retaining region VA2.

The holder 14 has a central columnar portion 14a and columnar portions 14b on both ends thereof. The holder 14 is suspended and supported by two supporting shafts 15 through the columnar portions 14b on both ends thereof. The holder supporting shafts 15 are connected to a separate ball screw (not shown) from the one mentioned above, and the ball screw is driven by a separate servomotor (not shown) from the one mentioned above. Hence, the holder 14 is also moved up and down by driving the servomotor independently of the vertical movement of the retaining plate 11 and the box 12.

Using the bonding apparatus 100, the bonding step may be carried out as set forth below. First, the array substrate 1 and the color filter substrate 5 are fixed to the lower vacuum chuck 20 and the upper vacuum chuck 10, respectively, of the bonding apparatus 100 by vacuum holding. More specifically, the array substrate 1 is stuck to the lower vacuum chuck 20 by creating a vacuum-type situation in the internal chamber thereof. Similarly, the color filter substrate 5 is stuck to the upper vacuum chuck 10 by creating a vacuum-like environment for all the chambers 121 through 123. Thus, the array substrate 1 and the color filter substrate 5 are maintained parallel to each other with a predetermined gap therebetween. For the avoidance of a doubt, a theoretical pure vacuum is not required.

Subsequently, the LC alignment stage 30 is used to match the relative positions of the array substrate 1 and the color filter substrate 5.

After matching the relative positions, the bonding apparatus 100 bonds the array substrate 1 and the color filter substrate 5 to each other in an atmosphere of a low vacuum level ranging from 100 to 100 kPa, preferably from 2.7 k to 50 kPa. Carrying out the bonding step in the low vacuum atmosphere makes it possible to prevent the array substrate 1 and the color filter substrate 5, both of which are stuck by high-vacuum holding, from coming off the chucks.

Figure 6:
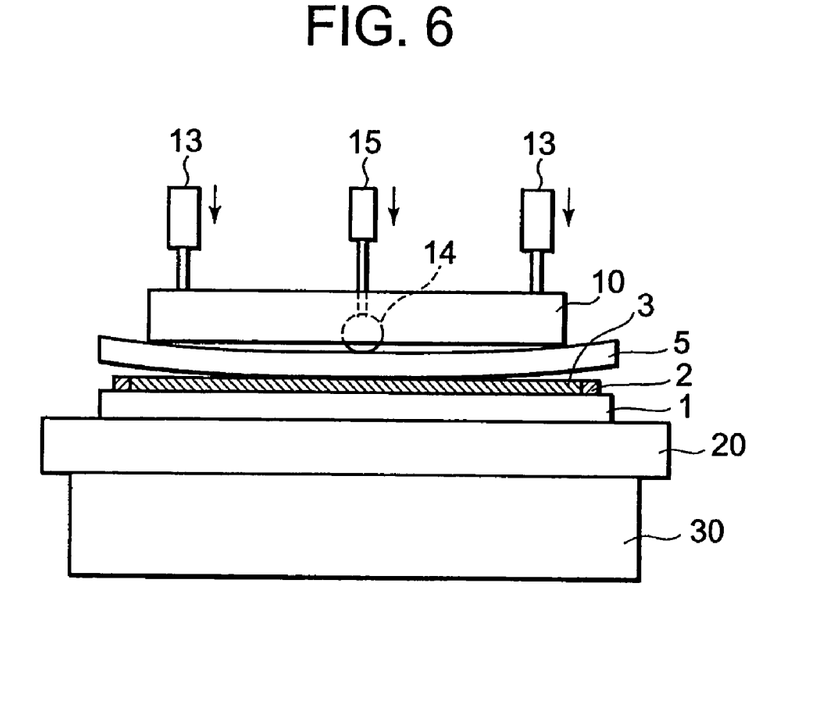
FIG. 6 is a side view illustrating a bonding process carried out by the bonding apparatus shown in FIG. 2.

In the bonding step, ceasing the vacuum creating efforts for the inner chamber 121 of the upper vacuum chuck 10 is first ceased. This causes the retaining region VA1 associated with the inner chamber 121 to stop its vacuum holding, so that the region of the color filter substrate 5 stuck to the retaining region VA1 comes off the upper vacuum chuck 10. At this time, the upper vacuum chuck 10 itself is moved down toward the array substrate 1, causing the region, which has left the upper vacuum chuck 10, to come into contact with the array substrate 1. Furthermore, as shown in FIG. 6, the holder 14 descends to press downward the region that has left the upper vacuum chuck 10. Therefore, the region where the array substrate 1 and the color filter substrate 5 are in contact is pressed by the holder 14, thus making it possible to prevent the relative positions of the array substrate 1 and the color filter substrate 5 from being disturbed thereafter during the bonding step.

The diameter of the central columnar portion 14a of the holder 14 is smaller than the diameters of the columnar portions 14b on its both ends, so that the columnar portions 14b on both ends come in contact with the color filter substrate 5. As a result, the holder 14 comes in contact with the color filter substrate 5 at two locations, so that it is possible to securely prevent the color filter substrate 5 from turning. Moreover, the color filter substrate 5 is brought into contact with the columnar portions 14b having curved surfaces, which means "surface contact." This arrangement protects the color filter substrate 5 from being scratched when the holder 14 comes in contact therewith. Although the holder 14 shown in FIGS. 3 and 4 is columnar, it may have a different shape as long as its surface that is brought into contact with the color filter substrate 5 is curved.

When the state described above is maintained for a predetermined time, the contact area expands because the color filter substrate 5 is pulled by the liquid crystal due to the surface tension of the liquid crystal. After the predetermined time passes, the vacuum holding of the middle chamber 122 of the upper vacuum chuck 10 is stopped. This causes the retaining region VA2 associated with the middle chamber 122 to stop its vacuum holding, so that the region of the color filter substrate 5 which has been stuck to the retaining region VA2 comes off of the upper vacuum chuck 10. At this time, the upper vacuum chuck 10 itself is moved down by a predetermined distance toward the array substrate 1. As a result, with the elapse of time, the color filter substrate 5 is bonded such that bubbles are expelled outward from the center thereof due to its own weight and the surface tension of the liquid crystal. The holder 14 is retained as it is without being moved. The relative positions of the array substrate 1 and the color filter substrate 5 are thus maintained.

Figure 7:
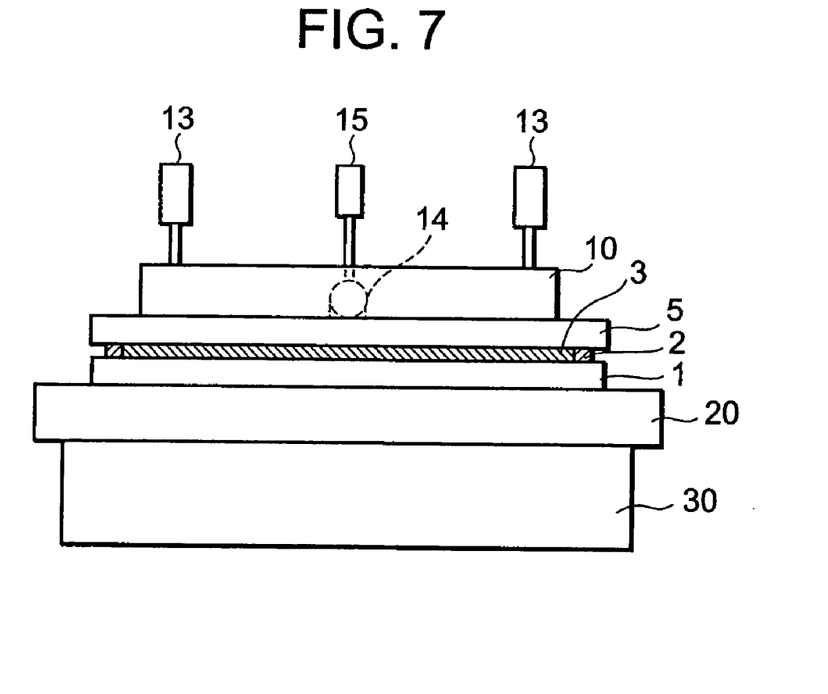
FIG. 7 is a side view illustrating a final step of the bonding process shown in FIG. 6.

Subsequently, the vacuum creating steps for the outer chamber 123 of the upper vacuum chuck 10 are ceased, and the upper vacuum chuck 10 is moved down toward the array substrate 1 by a predetermined distance. As a result, the color filter substrate 5 and the array substrate 1 are bonded without disturbing their relative positions, as shown in FIG. 7.

In the bonding step according to the embodiment, only the central portion of the color filter substrate 5 is first brought into contact with the array substrate 1, then the contact area is expanded. At this time, the bubbles in the liquid crystal can be expelled outside by making use of the weight of the color filter substrate 5 and the surface tension of the liquid crystal. This arrangement obviates the need for carrying out the bonding step in an atmosphere of a medium degree of vacuum as in the prior art, and prevents bubbles from remaining in the liquid crystal during the bonding step carried out in an atmosphere of a low degree of vacuum. The results are a shorter time required for creating the vacuum-type situation and a higher throughput. In addition, a vacuum system can be structurally simplified, permitting a reduced cost of the apparatus to be achieved. Moreover, since the holder 14 presses the color filter substrate 5, the color filter substrate 5 and the array substrate 1 will not be dislocated during the bonding operation. This prevents deterioration of the quality of the finished product caused by the two substrates being dislocated.

In this embodiment, a liquid crystal has been applied to the array substrate. Alternatively, however, a liquid crystal may be applied to the color filter substrate. Similarly, although the array substrate has been set onto the lower vacuum chuck, the color filter substrate may alternatively be set onto the lower vacuum chuck.

Although the bonding step has been performed in the low-level vacuum atmosphere in this embodiment, it may alternatively be performed under atmospheric pressure as long as the substrates are bonded while expelling bubbles from a liquid crystal as described above. In this embodiment, the upper vacuum chuck 10 has three chambers; however, the number of the chambers may be at least two, or four or more. In this embodiment, the chambers provided on both sides of the holder 14 communicate with each other to form a single chamber; however, the chambers do not have to necessarily communicate. In this case, however, each of the chambers on both sides must be provided with vacuum holes. As another alternative, multiple chamber units may be arranged in a matrix pattern, and creating the vacuum-like situation for the chambers units may be stopped in sequence outward, beginning with the chamber unit located in a central region, then a chamber unit around it.

While an embodiment of the present invention has been described, the aforesaid embodiment is merely an example for embodying the invention. It is to be understood, therefore, that the invention is not limited to the disclosed embodiment To the contrary, the invention is intended to cover various modifications and equivalent arrangements included within the spirit and scope of the invention.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A manufacturing method for a liquid crystal display device, comprising the steps of:
   applying a liquid crystal to a first substrate;
   fixing the first substrate by a first vacuum chuck;
   fixing a second substrate by a second vacuum chuck;
   the second vacuum chuck comprising a plurality of retaining regions on a chuck surface thereof, the plurality of retaining regions being capable of performing mutually independent retaining operations and being disposed outward from the center of the chuck surface, and
   bonding a second substrate to a surface of the first substrate to which the liquid crystal has been applied,
   the retaining operations of the plurality of retaining regions being stopped in order outward from the center in the bonding step,
   wherein a predetermined region of the second substrate is bonded to the first substrate, and the bonded region is expanded with the elapse of time.

2. The manufacturing method for a liquid crystal display device according to claim 1, wherein the predetermined region is pressed in the bonding step.

3. The manufacturing method for a liquid crystal display device according to claim 1, wherein the bonding step is carried out in an atmosphere of 2.7 k to 50 kPa.

4. The manufacturing method for a liquid crystal display device according to claim 1, wherein the second vacuum chuck further comprises a holder that presses the second substrate, and the predetermined region is pressed by the holder in the bonding step.

* * * * *